Aug. 9, 1960    J. J. PENN    2,948,381
ARTICLE TRANSFER AND SPACING DEVICE
Filed Sept. 10, 1958
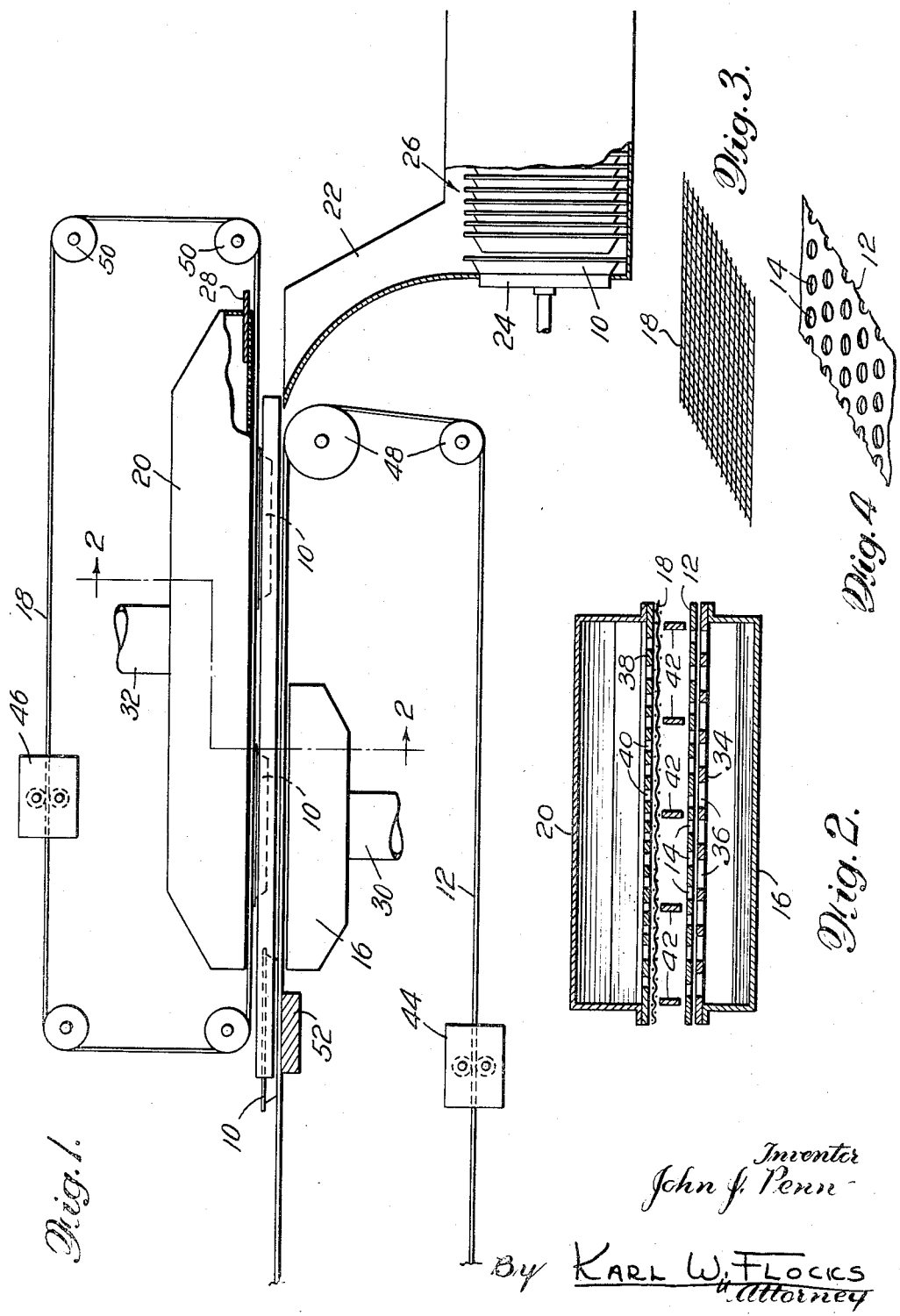
Inventor
John J. Penn
By Karl W. Flocks
Attorney

United States Patent Office 2,948,381
Patented Aug. 9, 1960

2,948,381

ARTICLE TRANSFER AND SPACING DEVICE

John J. Penn, Darien, Conn., assignor to Diamond National Corporation, a corporation of Delaware Filed Sept. 10, 1958, Ser. No. 760,108

4 Claims. (Cl. 198—34)

This invention relates to article transfer and spacing devices, and more particularly to improvements in conveying devices for transferring lightweight articles while simultaneously effecting desired spacing between such articles.

Lightweight articles which are also fragile or flimsy in construction present special problems in the conveyance and transfer thereof, due to inherent difficulties in grasping and controlling the movement of such articles without incurring damage thereto. Flimsy articles, such as thin sheets of paper, and fragile articles, such as molded pulp plates, are readily susceptible to crumpling, marring and other damage by forceful positive contact therewith. Furthermore, in handling or manufacturing large quantities of such articles, it is often desirable to control the spacing between successive articles being conveyed, and it is important to accomplish this result without employing fingers or other gripping devices for holding or retarding the articles, in order to avoid damaging the articles. Jets of air have sometimes been employed to facilitate these operations, but the pneumatic devices known heretofore have had undesirable limitations in regard to capability of accomplishing both the transfer and the spacing of the articles.

An object of the present invention is to provide a new and improved article transfer and spacing device for lightweight articles.

Another object of the invention is to provide a new and improved conveying device for transferring lightweight fragile or flimsy articles, while simultaneously effecting desired spacing between such articles.

Still another object of the invention is to provide a new and improved pneumatic device for transferring and spacing lightweight fragile or flimsy articles without incurring damage thereto.

Other objects and the nature and advantages of the instant invention will be apparent from the following description, considered in conjunction with the accompanying drawings, wherein:

Fig. 1 is a side elevation view of an article transfer and spacing device embodying the invention, shown in relation to a pair of conveyor belts for transporting molded pulp articles;

Fig. 2 is a transverse vertical section taken along line 2—2 of Fig. 1;

Fig. 3 is a perspective view of a portion of one of the conveyor belts shown in Figs. 1 and 2, and Fig. 4 is a perspective view of a portion of the other conveyor belt of the pair shown in Figs. 1 and 2.

The illustrated embodiment of the invention is designed for transporting molded pulp articles such as pie plates, food trays, cake circles, and other lightweight shallow containers. Such articles are customarily produced by suction molding them from liquid pulp slurry and then drying them by conveying them through an elongated oven. The illustrated device transfers the articles from the drying oven to a stacking and storage area, and at the same time the spacing between successive articles is increased to a predetermined extent in order to insure adequate separation between adjacent articles prior to allowing them to fall down a chute to an automatic stacker, where the articles are then stacked in a nested relationship.

Referring particularly to Fig. 1, a plurality of molded pulp pie plates 10 are supported on the upper course of a generally horizontally disposed endless conveyor belt 12, which advances the plates 10 through a drying oven (not shown) and thence from left to right, as viewed in Fig. 1, in a direction away from the drying oven. The plates 10 are arranged at closely spaced uniform intervals longitudinally of the belt 12, and they may be in a single column or in a plurality of adjacent parallel columns transversely of the belt 12. This arrangement of the plates 10 on the belt 12 may be formed by deposition thereonto from a conventional rotary pulp molding machine (not shown).

The conveyor belt 12 is provided with a plurality of perforations 14 distributed uniformly over its entire surface area, as is shown in detail in Fig. 4. The perforations 14 allow circulating heated air to flow through the conveyor belt 12 when it is in the interior of the drying oven, thereby increasing the efficiency of the drying operation and reducing possible warpage in the dried articles by promoting uniform drying on all sides of the articles.

For the purpose of the present invention, the perforations 14 permit passage therethrough of an upward blast of air from a fixed air pressure chamber 16 across which the conveyor belt 12 is continuously advanced. This blast of air causes the successive plates 10 float upwardly onto the underside of the lower course of a generally horizontally disposed endless conveyor belt 18, which is mounted adjacent and parallel to the conveyor belt 12. The belt 18 may be perforated also, but it is preferably of open mesh construction, as shown in detail in Fig. 3, and the plates 10 are held on the underside of this conveyor belt by the action of suction from a vacuum chamber 20, which is mounted thereabove between the upper and lower courses of the belt 18 and extends a substantial distance therealong. One end of the vacuum chamber 20 is positioned directly opposite the pressure chamber 16, and the other end of the vacuum chamber 20 overhangs a conveyor chute 22 into which the plates 10 are dropped by termination of the suction at this end of the vacuum chamber 20.

The conveyor chute 22 is mounted at a suitable inclination from vertical, and at the bottom of this chute is an automatic counter and stacking mechanism 24, which pushes the successive plates 10 edgewise into a nested stack 26. An adjustable removable baffle 28 may be mounted in the end of the vacuum chamber 20 which overhangs the chute 22 in order to provide some control over the point of release of the articles being held by suction, since it may be desired to adjust this point of release in the vicinity of said end of the vacuum chamber 20 for different sizes and types of articles being conveyed.

The pressure chamber 16 is connected by a pipe 30 to a suitable source of compressed air, and similarly the vacuum chamber 20 is connected by a pipe 32 to a suitable source of vacuum. It may be observed in Fig. 1 that the pressure chamber 16 is relatively short in comparison with the length of the vacuum chamber 20. This short length of the pressure chamber 16 is adequate for performing its sole function of transferring the successive plates 10 from the lower conveyor belt 12 to the upper conveyor belt 18. The upperside of the pressure chamber 16 is provided with a perforated face plate 34 having a plurality of relatively large perforations 36 uniformly distributed over its entire area, as shown in Fig. 2, and this face plate is spaced closely to the underside of the upper course of the perforated conveyor belt 12.

In a similar manner, the underside of the vacuum chamber 20 is provided with a perforated face plate 38 having a plurality of uniformly distributed perforations 40 therein. The perforations 40 may be made somewhat smaller than the perforations 36, if desired, depending upon the strength of the applied pressure and suction. In the case of molded pulp pie plates being conveyed by the apparatus illustrated, it has been determined that a pressure equivalent to approximately a plus five inches of water column and a vacuum equivalent to approximately a negative five inches of water column would operate successfully.

When the articles being conveyed are arranged in a plurality of adjacent parallel columns transversely of the conveyor belt 12, rather than in a single column, the columns may be kept separated from each other during the transfer operation by means of a plurality of parallel partitions 42 mounted midway between the belts 12 and 18 and aligned longitudinally therewith. The partitions 42 are preferably mounted adjustably so that articles of different sizes and types may be conveyed simultaneously in different columns. It is evident that several chutes, such as the chute 22, and associated stacking mechanisms would be required when several columns of articles are being transferred at the same time.

An important feature of the invention is the fact that the upper conveyor belt 18 is driven at a greater speed than the lower belt 12, thereby increasing the spacing between successive conveyed articles in each of the columns thereof, as they are transferred from one of the belts to the other. This result is accomplished by providing a drive unit 44 to advance the conveyor belt 12 at one constant predetermined speed, and having a second drive unit 46 for propelling the conveyor belt 18 at another constant speed which is higher than the first-mentioned speed. A plurality of guide rolls 48 and 50 are provided for directing the conveyor belts 12 and 18, respectively, along their endless paths, and the drive units 44 and 46 may be located at any convenient points along said paths. By spacing the articles being transferred in this manner, the need for fingers or other gripping devices for holding or retarding the articles by dragging action is eliminated. Consequently, the possibility of damaging the articles by direct blows or other forceful contacts therewith is substantially eliminated. Furthermore, this system of spacing the articles is entirely automatic.

Since some molded pulp articles may evidence surface stickiness which might cause a tendency for them to stick to the conveyor belt 12, a vibrator 52 is mounted below this belt just in advance of the pressure chamber 16 for shaking such articles loose. In some cases it may be desirable to interconnect the controls for the two drive units 44 and 46, in order to provide for maintaining the same speed differential between the belts 12 and 18 while speeding up or slowing down both of them to change their resultant effective conveying speed.

Briefly summarizing the operation of the device, the molded pulp plates 10 are continuously advanced in succession by the perforated lower conveyor belt 12 from left to right, as viewed in Fig. 1, at a constant predetermined speed towards the pressure chamber 16. As the plates 10 approach the chamber 16, any of them which happen to be adhering to the surface of the belt 12 are shaken loose therefrom by the vibrator 52. Continued movement of the belt 12 carries the plates 10 to a position directly above the chamber 16, whereupon the upward blast of air issuing from the perforations 36 in the face plate 34 of the chamber 16 flows through the perforations 14 in the belt 12 and lifts the plates 16 upwardly in succession. The plates 10 float upwardly on this current of air and are carried thereby into face-to-face contact with the underside of the lower course of the open mesh upper conveyor 18 where they are then held by suction from the vacuum chamber 20. This suction may also assist in lifting the plates 10 upwardly and transferring them from the lower belt 12 to the upper belt 18. During this transfer operation the partitions 42 maintain separation between the different columns of articles being transferred, such as the plates 10. The suction effect produced on the lower face plate 38 of the vacuum chamber 20 continues to hold the plates 10 on the underside of the conveyor belt 18 as they are carried beyond the end of the lower conveyor and thence over to a position above the chute 22, where the suction is terminated by having reached the adjustable baffle 28 at the end of the vacuum chamber 20, thereby allowing the plates 10 to fall by gravity into the chute 22. Due to the fact that the conveyor belt 18 is always advanced at a higher speed than that of the conveyor belt 12, the spacing between the plates 10 is automatically increased substantially as they are transferred successively from the lower belt 12 to the upper belt 18. Finally, the automatic counter and stacker mechanism 24 at the bottom of the chute 22 pushes the plates 10 edgewise into the nested stack 26.

The single specific embodiment of the invention which has been illustrated and described is designed particularly for transferring and spacing lightweight articles which are relatively large in area in relation to their mass, thereby enabling them to be lifted and transported readily by air currents alone. It is evident that the invention may be employed advantageously for conveying various other lightweight shallow containers besides the molded pulp pie plates specifically shown, as well as thin flimsy sheets of paper, and the like.

It will be obvious to those skilled in the art that various changes may be made without departing from the spirit of the invention, and therefore the invention is not limited to what is shown in the drawings and described in the specification, but only as indicated in the appended claims.

What is claimed is:

1. An article transfer and spacing device, comprising a first perforated endless belt conveyor disposed horizontally for supporting a succession of lightweight articles to be conveyed on its upper course, a second perforated endless belt conveyor disposed horizontally directly above the first conveyor and spaced closely thereto, an air pressure chamber mounted below the upper course of the first conveyor for directing a blast of air upwardly through said first conveyor to lift the articles successively therefrom and blow them against the underside of the upper conveyor, a vacuum chamber mounted above the lower course of the upper conveyor opposite the pressure chamber for holding the articles by suction on the underside of the upper conveyor as they are carried along over to a discharge point, an adjustable baffle mounted at one end of the vacuum chamber for adjusting the position of the discharge point by terminating the suction to cause the articles to drop from the upper conveyor, and means for advancing the upper conveyor at a higher speed than that of the lower conveyor to increase the space between successive articles as they are transferred.

2. An article transfer and spacing device, comprising a first perforated endless belt conveyor disposed horizontally for supporting a succession of lightweight articles to be conveyed on its upper course, a second perforated endless belt conveyor disposed horizontally directly above the first conveyor and spaced closely thereto, an air pressure chamber mounted below the upper course of the lower conveyor for directing a blast of air upwardly through the perforations in said conveyor to lift the articles successively therefrom and blow them against the underside of the upper conveyor, an elongated vacuum chamber mounted above said upper conveyor for holding the articles by suction on the underside thereof, one end of the vacuum chamber being mounted directly opposite the pressure chamber and the other end of the vacuum chamber being mounted at a discharge point where the articles are dropped by termination of the suction, baffle means for terminating the suction at the discharge point, means for advancing the lower belt conveyor at a predetermined speed, and means for advancing the upper belt conveyor at a speed higher than that of the lower conveyor to increase the space between successive articles as they are transferred.

3. An article transfer and spacing device, comprising a perforated endless belt conveyor disposed horizontally and adapted to support a succession of lightweight articles to be conveyed on its upper course in a plurality of parallel columns spaced transversely thereof, an open mesh belt conveyor disposed horizontally directly above the first-mentioned conveyor and spaced closely thereto, an air pressure chamber mounted below the upper course of the perforated lower conveyor for directing a blast of air upwardly through the perforations in said conveyor to lift the articles successively therefrom and blow them against the underside of the open mesh upper conveyor, an elongated vacuum chamber mounted above said upper conveyor for holding the articles by suction on the underside thereof, one end of the vacuum chamber being mounted directly opposite the pressure chamber and the other end of the vacuum chamber being mounted at a discharge point where the articles are dropped by termination of the suction, an adjustable baffle mounted in the vacuum chamber at the discharge point for terminating the suction, a plurality of partitions mounted between the upper and lower conveyors and in longitudinal alignment therewith for maintaining separation between the parallel columns of articles as they are transferred from the lower to the upper conveyor, means for advancing the lower belt conveyor at a predetermined speed, and means for advancing the upper belt conveyor at a speed higher than that of the lower conveyor to increase the space between successive articles as they are transferred.

4. An article transfer and spacing device, comprising a perforated endless belt conveyor disposed horizontally and adapted to support a succession of lightweight articles to be conveyed on its upper course in a plurality of parallel columns spaced transversely thereof, an open mesh belt conveyor disposed horizontally directly above the first-mentioned conveyor and spaced closely thereto, an air pressure chamber mounted below the upper course of the perforated lower conveyor for directing a blast of air upwardly through the perforations in said conveyor to lift articles successively therefrom and blow them against the underside of the open mesh upper conveyor, a vibrator mounted adjacent the perforated lower conveyor in advance of the pressure chamber for shaking conveyed articles loose from the belt just before they reach said chamber, an elongated vacuum chamber mounted above said upper conveyor for holding the articles by suction on the underside thereof, one end of the vacuum chamber being mounted directly opposite the pressure chamber and the other end of the vacuum chamber being mounted at a discharge point where the articles are dropped by termination of the suction, an adjustable baffle mounted at the end of the vacuum chamber at the discharge point for adjusting the position of the discharge point in the vicinity of said end of the vacuum chamber by controlling the termination of the suction thereat, a plurality of partitions mounted midway between the upper and lower conveyors and in longitudinal alignment therewith for maintaining separation between the parallel columns of articles as they are transferred from the lower to the upper conveyor, a belt drive unit for advancing the lower belt conveyor at a predetermined speed, and another belt drive unit meshed with the upper belt conveyor and arranged to drive it at a higher speed than that of the lower conveyor, thereby increasing the space between successive articles as they are transferred.

References Cited in the file of this patent

UNITED STATES PATENTS

| | | |
|---|---|---|
| 1,959,238 | Horsfield | May 15, 1934 |
| 2,069,397 | Barth | Feb. 3, 1937 |
| 2,168,419 | Paterson | Aug. 8, 1939 |
| 2,404,882 | Monaco | July 30, 1946 |
| 2,897,952 | Buccicone | Aug. 4, 1959 |

FOREIGN PATENTS

| | | |
|---|---|---|
| 750 824 | Great Britain | June 20, 1956 |